Nov. 18, 1969  L. P. DUNCAN  3,479,008
SELF-CLEANING VALVE FOR VACUUM MILKING SYSTEM
Filed June 7, 1967  4 Sheets-Sheet 1

INVENTOR
LLOYD P. DUNCAN

BY *Mason, Mason & Albright*
ATTORNEYS

Nov. 18, 1969   L. P. DUNCAN   3,479,008
SELF-CLEANING VALVE FOR VACUUM MILKING SYSTEM
Filed June 7, 1967   4 Sheets-Sheet 2
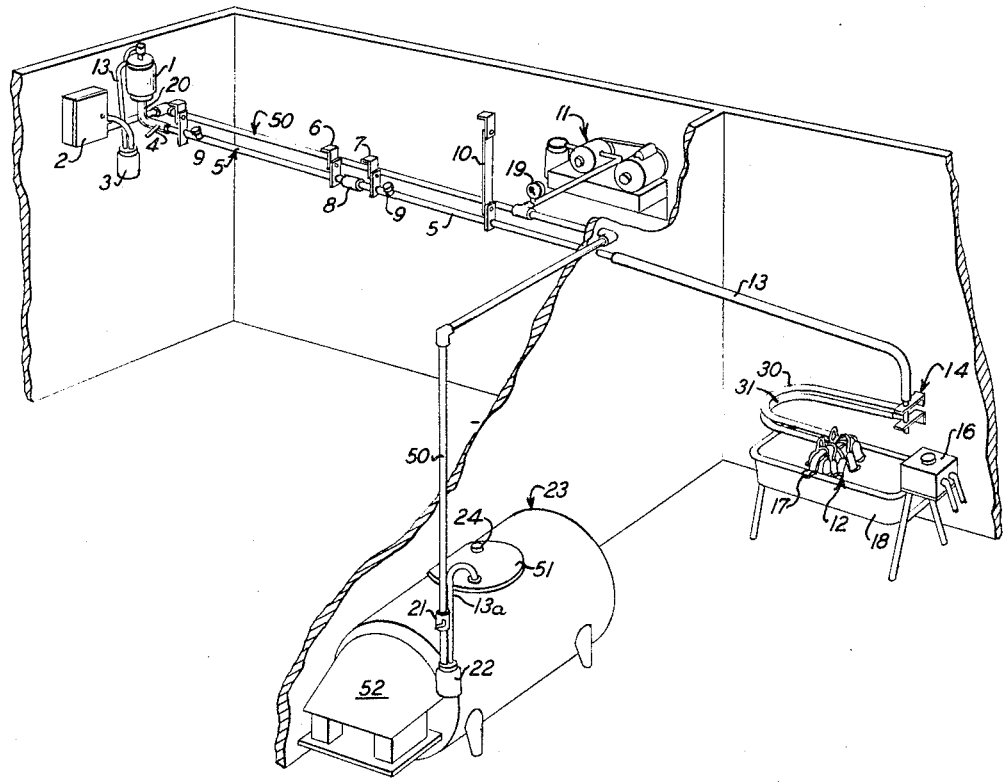
Fig. 2
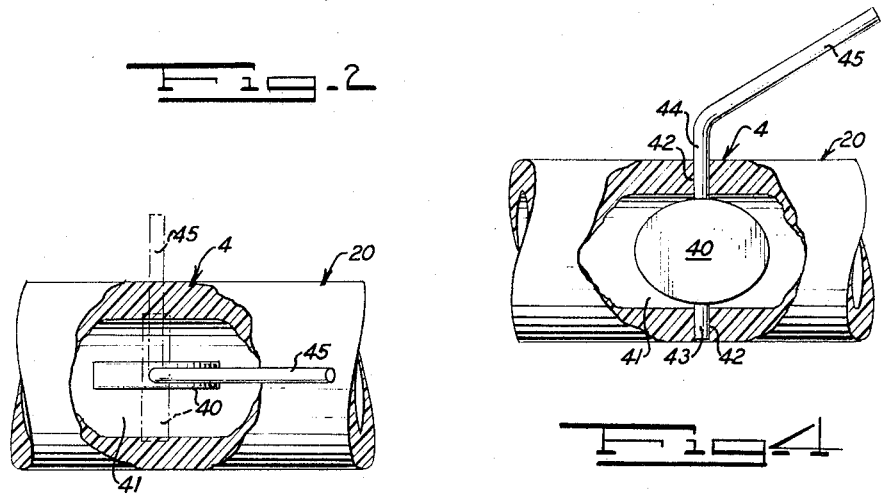
Fig. 3
Fig. 4
INVENTOR
LLOYD P. DUNCAN
BY *Mason, Mason & Albright*
ATTORNEYS

INVENTOR
LLOYD P. DUNCAN

Nov. 18, 1969   L. P. DUNCAN   3,479,008
SELF-CLEANING VALVE FOR VACUUM MILKING SYSTEM
Filed June 7, 1967   4 Sheets-Sheet 4

INVENTOR
LLOYD P. DUNCAN
BY
Mason, Mason & Albright
ATTORNEYS

United States Patent Office 3,479,008
Patented Nov. 18, 1969

3,479,008
SELF-CLEANING VALVE FOR VACUUM MILKING SYSTEM
Lloyd P. Duncan, Washington, Mo., assignor to Zero Manufacturing Company, Washington, Mo., a corporation of Missouri
Continuation-in-part of application Ser. No. 372,492, June 4, 1964. This application June 7, 1967, Ser. No. 657,445
Int. Cl. F16k 5/04, 31/60, 15/14
U.S. Cl. 251—297                                    8 Claims

ABSTRACT OF THE DISCLOSURE

A valve for resilient rubber or plastic tubing in a pipeline milking system which is circular or elliptical in shape and turns about a stem that is received in opposed openings drilled in the tubing. One end of the stem is bent sufficiently to turn the valve from outside the tubing. The valve and stem are integral and removable from the interior of the tubing. When vacuum is applied, the tubing compresses around the opening to give a tight seal. However, in the washing cycle without the application of vacuum, the area around the openings is washed—particularly with the elliptical valve. To prevent inadverent opening or closing of the valve, shallow indentations may be provided in the tubing to hold the valve in opened or closed positions.

CROSS REFERENCES TO RELATED APPLICATIONS

This application is a continuation-in-part of application Ser. No. 372,492, filed June 4, 1964 and now abandoned.

BACKGROUND AND OBJECTS OF THE INVENTION

This invention relates to a valve assembly including a flexible tube with a valve body arranged to open and positively close the passageway in the tube, which valve has a minimum of moving parts. More particularly, this invention is concerned with a valve assembly suitable for use in a vacuum milking system, which assembly can readily be inspected and is self-cleansing in situ, there being no sanitary necessity of disconnecting the vacuum lines and disassembling the valve.

Equipment suitable in the dairy industry for handling milk must be cleaned and inspected regularly. Frequent washings and inspetcions must be made of milk tanks, milking teat cups and vacuum conduits and lines. This is required twice a day on much of the equipment and is a time-consuming and tedious operation.

The most modern systems provide means to route milk from the cows directly to cooling tanks so that it is unnecessary for the milk to be handled by hand. Such systems include valves and other moving parts that must be thoroughly cleansed, necessitating disassembly and washing. Not only are such procedures costly from the standpoint of the labor involved, but the possibility of contamination is increased. It is much preferred to clean the entire milk system, including the valves, in situ.

Accordingly, it is an object of the present invention to provide a valve assembly that has the fewest possible parts, which parts can be easily assembled and disassembled when necessary.

It is another object of the present invention to provide a valve assembly that is self-cleansing in situ.

It is a further object of the present invention to provide a valve assembly that can be used in lines exposed to vacuum which will open and positively close a passageway and which will not be displaced from opened or closed position by fluid movement in the lines.

These and other objects will be readily apparent from the drawings and descriptions wherein:

BRIEF DESCRIPTION OF THE DRAWINGS

FIGURE 2 is a view similar to that of FIGURE 1 except the parts are in washing arrangement;

FIGURE 3 is a plan view of the valve and tube in opened position;

FIGURE 4 is a side elevation of the valve and tube in open position;

DESCRIPTION OF THE PREFERRED EMBODIMENTS

Figure 1:
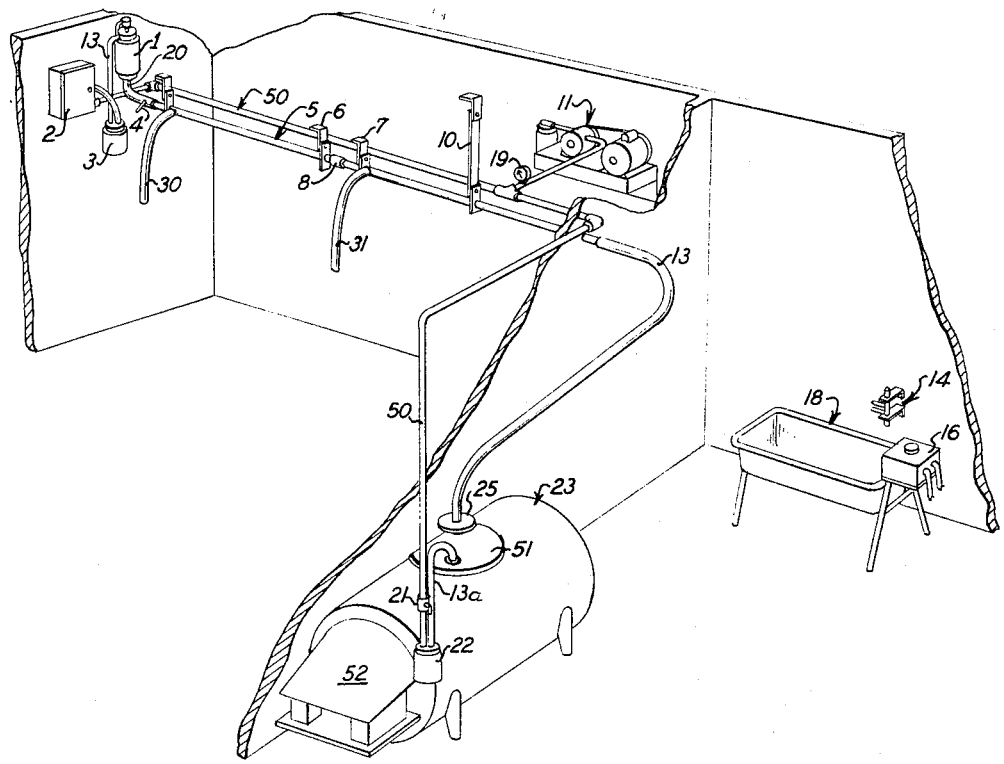
FIGURE 1 is a perspective view partly broken away showing a milking system with the parts in milking arrangement.

FIGURE 1 shows a vacuum system wherein reference numeral 1 designates a washer reservoir, 2 is a time control system, 3 is a moisture trap and 4 is the valve assembly that is an indispensable part of the present invention. The washer is used only when the milk line 5 is being washed. Accordingly, it is shut off in FIGURE 1. Hangers 6, 7, and 10, attached on their upper end to a ceiling (not shown), hold line 5 which includes nipples from which removable extension lines 30 and 31 lead to the teat cup assemblies 12 fitted on the cows. Line 5 is made of tubing that is preferably transparent, such as glass. The portion in which valve 4 is located, the extensions 30 and 31 to the teat cups, and the tubing 13 are also preferably transparent and are flexible. Plastics such as the vinyl halides, polyvinyl chloride in particular, are commonly used, although other materials that are inert to milk and flexible at ambient temperatures can also be used. The sections of tube 5 are joined by connector 8 and the openings for the extension lines 30 and 31 in tube 5 are closed by nipple closures 9 that may be retained conveniently adjacent the openings to which the teat cup extensions lead. Vacuum line 50 leads from time control 2 to create a vacuum in trap 3 and reservoir 1 as well as in the line 20 between the reservoir 1 and valve 4. The line 50 extends, through a T-joint and past pressure or vacuum gauge 19, to vacuum pump 11. Also, the vacuum line 50 is connected to lid 51 of vacuum bulk milk tank 23 through vacuum line valve 21, moisture trap 22, and tubing 13a.

As shown in FIGURE 1, vacuum line 5 can be connected to the larger diameter tube 13 which leads into the lid 51 of the tank 23 through the inline strainer 25. Due to the vacuum created by vacuum pump 11 in line 50 and tank 23, milk direct from the cows enters line 5 from extensions 30 and 31 and passes through the filter or strainer 25 into tank 23. Tank 23 is refrigerated, the refrigerator unit being indicated at 52.

When it is desired to wash the entire line and apparatus, the vacuum pump 11 and system are used to advantage. Tube 13, as shown in FIGURE 1, is disconnected from tank 23 and the tube opening in lid 51 is closed with cap 24. The end of the tube 13 is then connected to the hose extensions 30 and 31 by means of manifold 14, as shown in FIGURE 2. The hose extensions include teat cup assemblies 12. A wash vat 18 is filled with cleaning solution and the assemblies are held by rack 17 with the teat cups immersed in the solution. Dispenser 16 is connected to hot and cold water outlets and the proper amount of soap is dispensed together with water into the wash vat.

Valve 4 is closed at all times during the milking operation. When washing the line and apparatus, however, valve 4 is opened and cleaning solution is drawn by vacuum created by pump 11 through each teat cup of assembly 12 to pass through the extensions 30 and 31, line 5, and the line 20 to the reservoir 1. The washer reservoir 1 accumulates wash and rinse water and in the vacuum cycle, the washing solution is drawn into the reservoir as shown in FIGURE 2. When the vacuum is released the solution returns to the vat 18. The time control 2 is coordinated with the dispenser 16 to regulate the time that the washing and rinsing solutions are retained in the line or flushed as desired. It is not necessary to wash the milking equipment beyond the reservoir 1 and accordingly the moisture trap 3 is provided with valve means that limit the liquid to this point.

From the foregoing it will be appreciated that valve 4 not only must afford a watertight, airproof closure, but also must be accessible. The valve assembly must also have as few parts as possible in order that it can be readily cleaned, since milk is in contact with the valve during the milking operation. A highly desirable system is one that permits the valve to be visibly inspected without the necessity for disassembly and one that is self-cleaning.

Health authorities are particular in approving milking systems and encourage "CIP" or "Clean In Place" cleaning where possible. Thus, equipment manufacturers of milking machines and systems are admonished to devise systems that can be used and automatically cleaned twice a day, seven days a week, without removal in order to obviate all possible contamination. But heretofore CIP valves have not generally been found acceptable under the strict requirements of the art.

Figure 5:
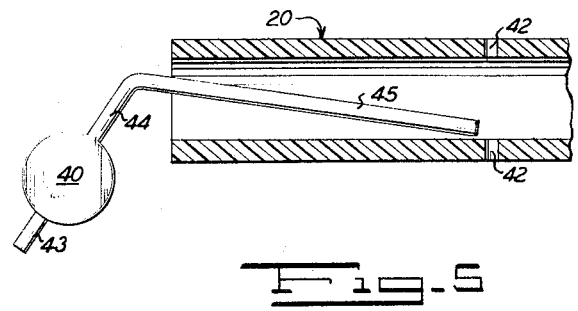
FIGURES 5-7 are side elevational views of the valve being inserted in the tube in sequence.
Figure 6:
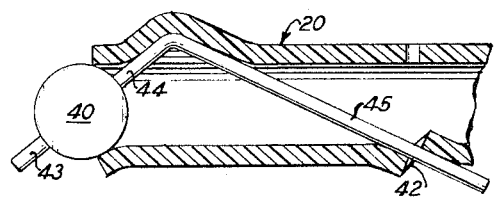
Figure 7:
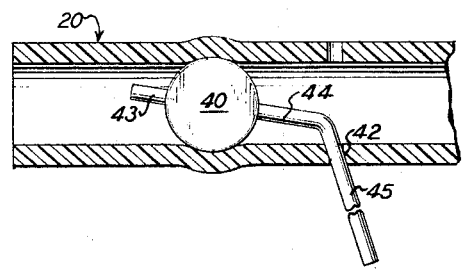

Referring to the valve per se, FIGURES 3 and 4 show valve body 4 with its disc 40 turnable in passageway 41 of tube 5. Disc 40 may be circular or oval, including elliptical or superelliptical in shape. In any case, the area of the disc is slightly greater than the cross-sectional area of passageway 41. In this connection it will be understood that the area involved is that which exists when there is a vacuum on tube 20. When there is not a vacuum on the tube 20, but rather the pressure within passageway 41 is somewhat greater than the outside atmospheric pressure, the area of disc 40 may be very slightly less than the cross-sectional area of passageway 41. Tube 20 is flexible and preferably transparent so that the valve can be constantly inspected. The tube is provided with apertures 42 at substantially opposite points through the diameter of the tube. Pin 43 and the straight portion 44 of the valve's stem are fitted in the apertures as shown in FIGURE 4 by the sequence illustrated in FIGURES 5, 6 and 7. The stem is bent to afford a handle portion 45. It will be apparent that the disc can be closed to distort slightly and bulge the tube, and thus to achieve a snug fit. If the disc is elliptical in shape, the circular passageway will be significantly bulged when the valve is moved into closed position. However, in open position the elliptical shape allows clearance for easy turning as shown in FIGURE 4.

The valve body should be formed of an integral piece of material so that no interfitting parts and cracks are present to harbor bacteria or promote contamination. Stainless steel such as is frequently used in sanitary equipment is suitable. Other materials, including those metals and plastics that are inert to milk and the cleaning solutions and which not susceptible to corrosion under moist conditions, can be used.

It will also be apparent that the valve may be easily disassembled if necessary. However, one of the objects of the present invention is to provide a valve that is self-cleansing and it has been found that the flexing of the tube 5 by the turning of the valve disc 40 has this "cleaned in place" capability.

Figure 8:
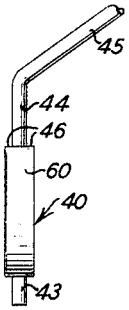
FIGURE 8 is a side view of the valve disc.

FIGURE 8 is a side view of the preferred form of disc 40 wherein pin 43 and straight portion 44 extend radially from the round rim 60 of the disc. When the pin and straight portion are joined intermediate the edges of rim 60, sealing shoulders 46 are formed that initially engage the inner surfaces of tube 5 when the disc is turned to open or closed positions.

Figure 9:
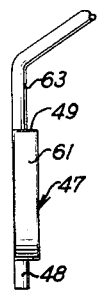
FIGURE 9 is a side view of a modified valve disc.

In FIGURE 9 disc 47 has pin 48 and straight portion 63 extending radially from rim 61, but these elements abut the edge of the rim so that sealing shoulder 49 is formed at one side only of the disc. In either form, the valve and tube are fluid-tight and no leakage occurs either around the disc or through the apertures in tube 5. Moreover, the valved passageway admits no air and vacuum is maintained in the lines.

In practice, when the valve 4 is exposed to vacuum, there is an effective seal in shoulders such as shoulders 46 and portions 49, and with the valve in closed position with vacuum on one or both sides, the passageway 41 is effectively closed. However, with valve 4 opened and washing fluid being flushed through line 20, washing occurs in the shoulder areas and there may be leakage of the washing liquid through apertures 42.

Figure 10:
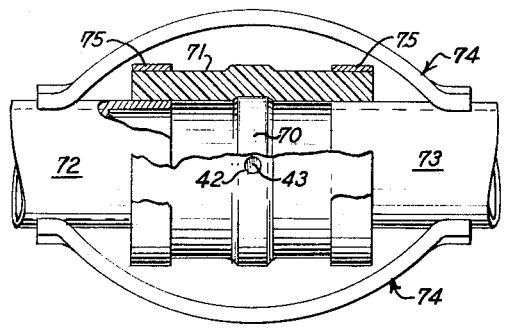
FIGURE 10 is a side view of the valve body and tube being used to bridge two rigid pipes.

FIGURE 10 shows the valve 70 in flexible transparent tube 71, which assembly is used to bridge pipes 72 and 73 and provide a visible closure member. Clamps in the form of rings or bands 75 are tightened so that the flexible tube 71 is pressed lightly against each pipe 72 and 73. Thereafter, reinforcing members 74 are clamped or welded to the pipes and the valve assembly is retained in place.

One problem which sometimes occurs with valves as disclosed in FIGURES 1–9, is that during the washing cycle a fluid surge against the valve in opened condition may cause it to turn to a closed or partially closed position. In order to preclude such occurrences, and additionally to provide a self-cleaning valve suitable for direct connection to a vacuum tank such as tank 23, I have devised modified valve assemblies as shown in FIGURES 11–14.

Figure 11:
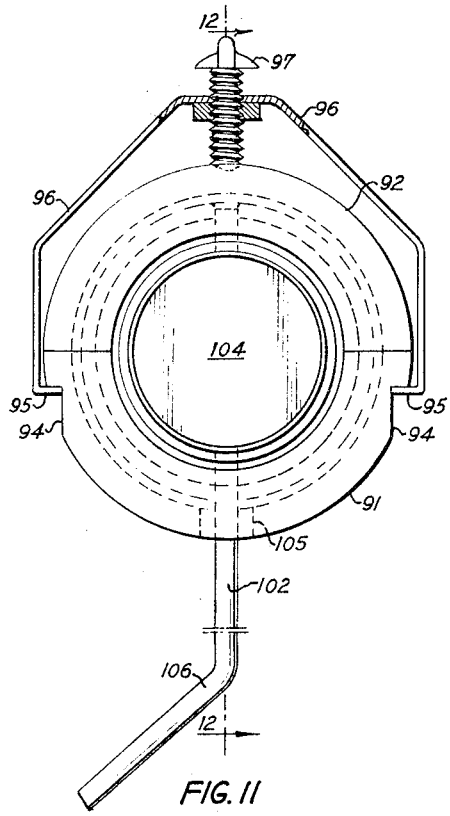
FIGURE 11 is an end view of a further modification of the valve.
Figure 12:
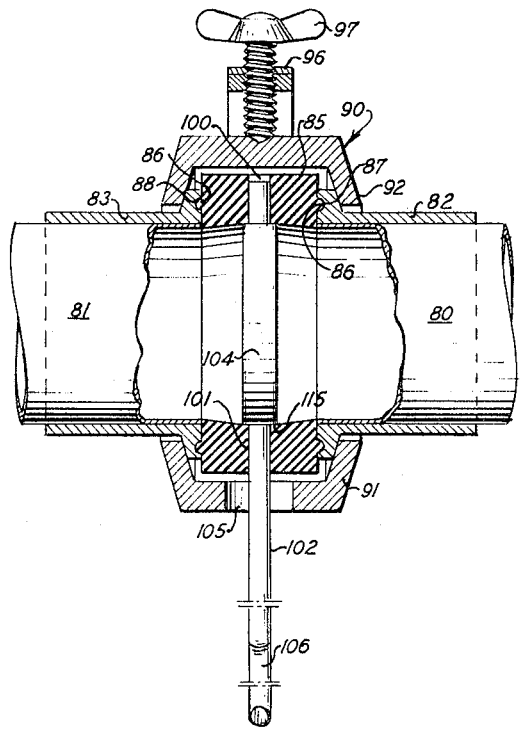
FIGURE 12 is a sectional view taken on lines XII—XII of FIGURE 11.

Referring now to FIGURES 11 and 12, pipes 80 and 81, which may be composed of glass, stainless steel or other suitable material, each have flange members 82 and 83, respectively, affixed thereto. A rubber tubular member 85 is disposed to abut between the flange members 82 and 83 and the pipes 80 and 81. The tubular member 85 includes on both sides annular protrusions 86 which dovetail with annular depressions 87 and 88 in flange members 82 and 83, respectively. The pipes 80 and 81 are aligned and held together by a stainless steel collar 90 which comprises two parts 91 and 92. Part 91 includes a pair of notches 94 on both sides which receive the inward extensions 95 of a collar clamp 96. A wing bolt 97, which is threadably received by clamp 96, is adapted to squeeze parts 91 and 92 together whereby, due to the inclined relationship of the interior of collar 90 to the inclined exteriors of flange members 82 and 83, the flange members 82 and 83 are brought together firmly to maintain the tubular member 85 in an abutting sealing position with pipes 80 and 81 and members 82 and 83, as shown.

The tubular member 85 includes a pair of opposed apertures 100 and 101 which receive a stem 102. A circular disc 104 is integral with the stem 102. It will be noted from the figures that stem 102, after extending outwardly through aperture 101 and an opening 105 in clamp part 91, includes a bent portion 106. It will be understood that the disc 104 and stem 102 are essentially the same as disc and stem shown in FIGURES 5–7 and are inserted and removed from tubular member 85 in substantially the same manner as shown with reference to line 20 in such figures.

Figure 13:
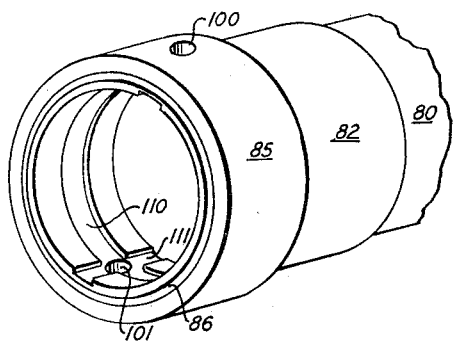
FIGURE 13 is a perspective view of the valve shown in FIGURES 11 and 12 with portions removed to permit inspetcion of the interior.

Referring to FIGURE 13, it will be noted that tubular member 85 has in its interior an annular slot 110 and a further slot 111 parallel to disc 104 in its opened position, the slots 110 and 111 crossing at apertures 100 and 101. The depth of the slots is exaggerated in the figure. In practice, the slots are of such minimal depth that complete drainage for proper cleaning occurs from both slots. However, they receive and engage the periphery of the disc 104 sufficiently to maintain same in an opened or closed position, as selected, despite the action of fluid surges thereon, while at the same time the valve can be manually opened or closed, as desired, due to the resilient nature of the tubular member 85.

The hygienical requirements which the valve must meet can hardly be overemphasized. Thus, an important aspect of the invention is that it can be totally and conveniently disassembled for manual cleaning and inspection although the cleaning in place operation maintains the valve in a highly sanitary condition.

Figure 14:
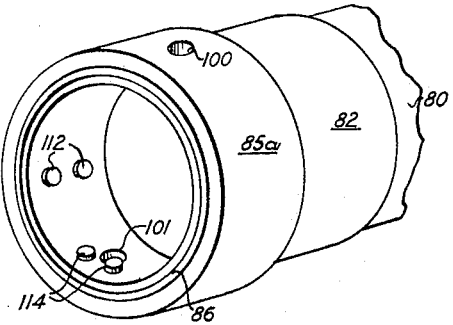
FIGURE 14 is a perspective view similar to FIGURE 13 showing modified means for maintaining the valve in either opened or closed position.

FIGURE 14 discloses a modified means for maintaining the valve in opened or closed position. Thus it will be noted that a tubular member 85a is similar to tubular member 85 except that, instead of slots 110 and 111, detent means comprising slight protuberances 112 are provided from the side of the tubular member 85a which are adapted to hold disc 104 in closed position, and slight protuberances 114 are adapted to hold it in an opened position. Since the protuberances 112 and 114 are composed of the same resilient material as the tubular member 85a, they will yield when the valve is manually closed or opened thereover while retaining the valve in an opened or closed position during milking and cleaning operations.

When the valves disclosed in FIGURES 11-14 are utilized in a position as valve assembly 4 in FIGURES 1 and 2, the disc 104 will be so dimensioned, relative to the tubular member 85 or 85a, that its shoulders 115 in the vicinity of apertures 100 and 101 are cleaned by surges of cleansing fluid and rinsing water when it is opened in the cleaning operation, whereas during milking operations the valve provides a tight seal. However, when such valves are utilized, as, say, a drain valve for a bulk milk tank with automatic cleaning, the disc 104 is dimensioned to give a somewhat tighter fit to preclude leakage when the tank is full of milk, while at the same time permitting adequate cleaning in opened position by the purging of cleansing fluid and rinsing water therethrough. To this end, disc 104 may be slightly flattened at shoulders 115 in the vicinity of apertures 100 and 101.

The foregoing detailed description has been given for clearness of understanding only, and no unnecessary limitations should be understood therefrom, for modifications will be obvious to those skilled in the art.

Having thus described my invention, what I claim as new and desire to secure by Letters Patent of the United States is:

1. A valve body in combination with milk withdrawing means and conduits leading therefrom connected to milk receiving means, said conduits including an elastic portion of substantially circular and constant cross section, said elastic portion composed of resilient material of sufficient strength to remain open when subjected to milking vacuum, the valve body comprising an elliptically-shaped disc received in said elastic portion, the major axis of said disc having a diameter greater than the interior diameter of said elastic portion and the area of said disc exceeding the undistorted interior cross-sectional area of said elastic portion wherein said disc is received, said major axis being substantially longer than the minor axis of said disc, an aperture in the walls of said portion, a stem integral with and extending normally from said disc substantially coaxial with the minor axis of said disc through said aperture, a further aperture in the walls of said portion axially aligned with said first mentioned aperture, a pin integral with and extending normally from said disc opposite said stem and received in said further aperture, whereby said disc can be turned by said stem in said elastic portion to opened and closed positions, said elastic portion being distorted by said disc in said latter position, the interior of said elastic portion being operatively subjected to vacuum and thereby drawn inwardly on one side of said disc when in a closed position.

2. A valve body in combination with a liquid food conduit of generally circular cross section composed of resilient material, said valve body comprising an elliptically-shaped disc received in said conduit, said conduit being substantially circular in cross section, the major axis of said disc having a diameter greater than the interior diameter of said conduit and the area of said disc exceeding the interior cross-sectional area of said conduit wherein said disc is received, the major axis of said disc being substantially greater than the minor axis, turning means for said disc adapted to turn same about its minor axis in said conduit to open and closed positions, said conduit being resiliently distorted by said disc in said latter position.

3. A valve body in accordance with claim 2, said conduit being provided with an aperture in its wall and said turning means comprising a stem connected to said disc substantially coaxial with its minor axis and extending through said aperture.

4. A valve for use in a milking system which comprises a resilient tubular member (85), a disc (104) received in said resilient tubular member, said disc conforming substantially to the interior of said resilient tubular member, means (102) extending from said disc exteriorly of said resilient tubular member adapted to turn said disc about an axis substantially perpendicular to the axis of said resilient tubular member, and detent means (110, 111, 112 and 114) within said resilient tubular member for selectively maintaining said disc in an opened or closed position relative to said resilient tubular member, said detent means comprising depressions (110, 111) in said resilent tubular member.

5. A valve in accordance with claim 4, wherein one of said depressions (111) is located in the lower portion of said resilient tubular member and is adapted to receive liquid which drain by gravity from the other of said depressions (110).

6. A valve in accordance with claim 4, wherein the periphery of said disc is flattened where said disc connects to said means (102).

7. A valve for use in a milking system including automatic cleaning equipment and vacuum producing equipment, said valve comprising a resilient tubular member (20, 85) adapted to have its volume reduced by application of vacuum, a disc (40, 104) received in said resilient tubular member, means (44, 45, 102) extending from said disc exteriorly of said resilient tubular member adapted to turn said disc about an axis substantially perpendicular to the axis of said resilient tubular member from an opened to a closed position, said disc having a cross-sectional area relative to said resilient tubular member that when in closed position with vacuum applied to at least one side thereof, the periphery of said disc is in sealing relationship with said resilient tubular member and having a diameter along its axis of rotation less than the member so that when in opened position during automatic cleaning the periphery of said disc is completely cleaned.

8. A valve for use in a milking system which comprises a resilient tubular member (85), a disc (104) received in said resilient tubular member, said disc conforming substantially to the interior of said resilient tubular member, means (102) extending from said disc exteriorly of said resilient tubular member adapted to turn said disc about an axis substantially perpendicular to the axis of said resilient tubular member, and detent means within said resilient tubular member for selectively maintaining said disc in an opened or closed position relative to said resilient tubular member, said detent means comprising protrusions (112, 144) in said resilient tubular member.

References Cited

UNITED STATES PATENTS

| | | | |
|---|---|---|---|
| 825,345 | 7/1906 | Perotti | 251—368 |
| 1,377,168 | 5/1921 | Awe | 251—297 X |
| 2,695,625 | 11/1954 | Ogle | 251—297 X |
| 2,867,238 | 1/1959 | Wilfert | 251—305 X |
| 2,965,354 | 12/1960 | Grove et al. | 251—297 X |
| 3,029,063 | 4/1962 | Moen | 251—306 |
| 3,291,443 | 12/1966 | Schulz et al. | 251—305 |
| 3,369,791 | 2/1968 | Snodgrass et al. | 251—148 X |

HENRY T. KLINKSIEK, Primary Examiner

U.S. Cl. X.R.

251—305